UNITED STATES PATENT OFFICE.

HENRY DEACON, OF WIDNES, ENGLAND.

IMPROVEMENT IN MANUFACTURE OF CHLORINE.

Specification forming part of Letters Patent No. 165,801, dated July 20, 1875; application filed July 1, 1875.

*To all whom it may concern:*

Be it known that I, HENRY DEACON, of Appleton House, Widnes, in the county of Lancaster, England, alkali manufacturer, have invented Improvements in the Manufacture of Chlorine, of which the following is a specification:

This invention relates to the manufacture of chlorine by what is known as Deacon's process, in which heated currents of hydrochloric-acid gas (usually that obtained in the manufacture of sulphate of soda) mixed with air are passed over heated porous substances, such as burnt clay, burnt pyrites, or the like, which substances are impregnated with chemical substances, such as sulphate of copper, and with others which I have in the specifications of my former patents termed active substances; and this invention consists in employing purifying materials or agents, in order to free the hydrochloric-acid gas employed for the before-mentioned purpose from the whole or from the greater proportion of the sulphuric acid which the hydrochloric-acid gas may contain. The separation of the sulphuric acid from the hydrochloric-acid gas may be effected either by washing the said hydrochloric-acid gas with aqueous hydrochloric acid, or by passing the hydrochloric-acid gas at an elevated temperature through a mass of a heated chloride, such, for example, as common salt, the object being to effect the absorption of the sulphuric acid contained in the gas, without any loss or material diminution in the quantity of the hydrochloric acid therein contained.

When using aqueous hydrochloric acid to wash the hydrochloric-acid gas, I employ an ordinary condenser, made of stone and filled with flints, bricks, or the like, and pass streams of the aqueous acid and of the hydrochloric-acid gas through the same, as when condensing hydrochloric acid in the ordinary way, except that the condenser should be kept warm, in order to keep the hydrochloric-acid gas in a gaseous condition, while at the same time effecting the entire or partial condensation of the sulphuric acid.

When passing the hydrochloric-acid gas through heated masses of chlorides, such as common salt, I place the chlorides in a solid and in a disintegrated form in suitable apparatus, which may be of cast-iron, to which heat can be applied, and I also heat the hydrochloric acid, (which may be effected by passing it through heated cast-iron pipes,) and the chlorides and the gas, when brought in contact, should have such a temperature as that the decomposition of the chlorides shall be effected by any sulphuric-acid gas which may be present. The aqueous hydrochloric acid employed as a purifying agent in the one case, and the heated chlorides in the other, may be used until the aqueous acid becomes practically saturated with sulphuric acid, and the chlorides be converted into sulphates. The purifying apparatus may be used in series, the impure hydrochloric-acid gas first entering the piece of apparatus which contains the purifying materials (aqueous hydrochloric acid or chlorides, as the case may be) in the most nearly saturated condition, and lastly leaving the piece of purifying apparatus which contains the fresh purifying materials.

I claim—

The described improvement in the manufacture of chlorine by the Deacon process, which consists in effecting the separation of sulphuric acid from the hydrochloric-acid gas employed in said process, by submitting such impure hydrochloric-acid gas to the action of aqueous hydrochloric acid, or of chlorides, such as chloride of sodium, at an elevated temperature, in the manner hereinbefore described.

In witness whereof I have signed my name to this specification in the presence of two subscribing witnesses.

HENRY DEACON.

Witnesses:
  S. CROWE,
  F. G. LARGE,
    2 *Waterloo Place, Pall Mall, London.*